Figure 1:
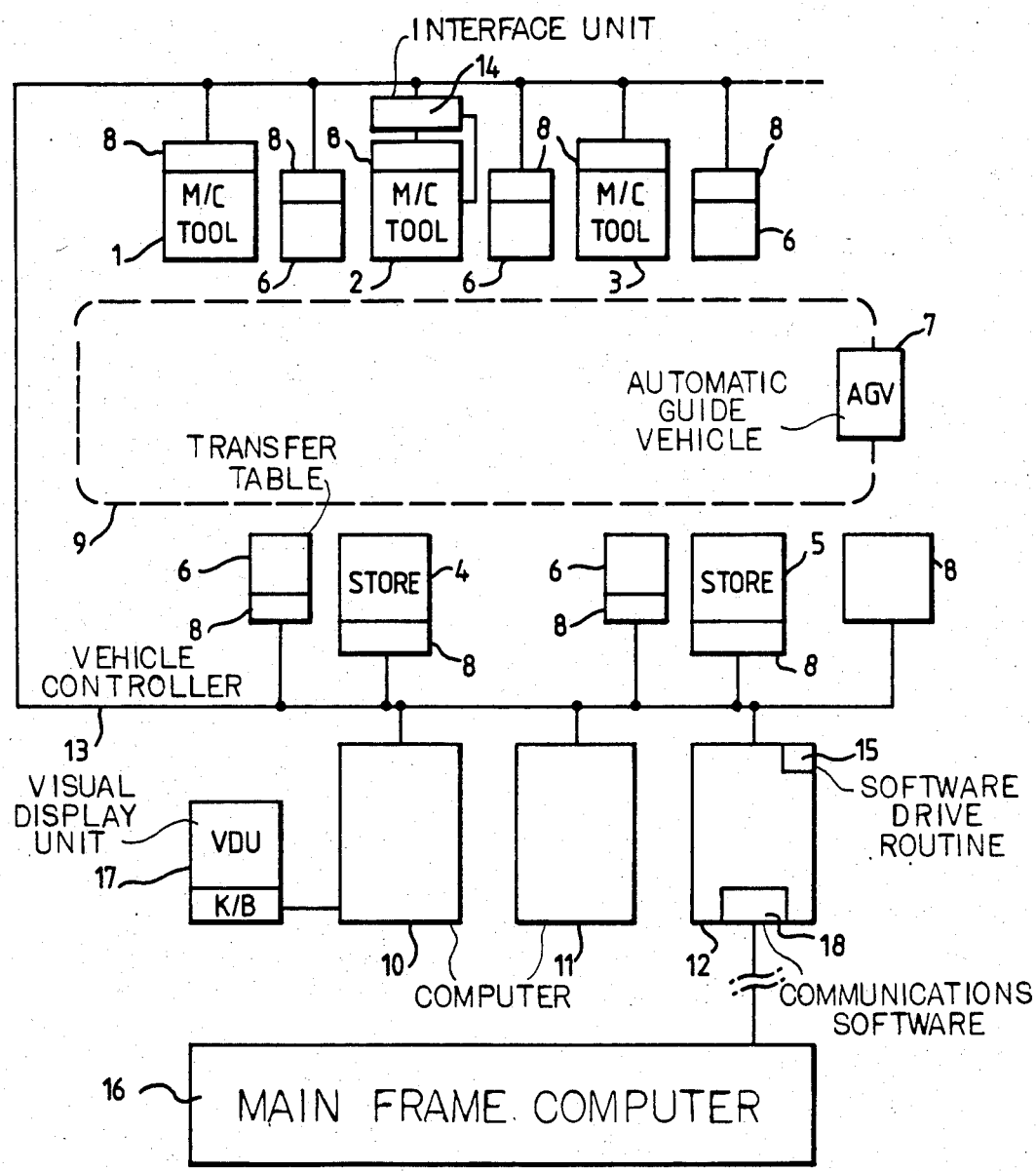

United States Patent [19]

Entwistle et al.

[11] Patent Number: 4,698,766

[45] Date of Patent: Oct. 6, 1987

[54] INDUSTRIAL PROCESSING AND MANUFACTURING SYSTEMS

[75] Inventors: Brian Entwistle; Peter Roberts; John M. Rogerson, all of Preston, England

[73] Assignee: British Aerospace PLC, London, England

[21] Appl. No.: 735,105

[22] Filed: May 17, 1985

[30] Foreign Application Priority Data

May 19, 1984 [GB] United Kingdom .................. 8412854
Mar. 12, 1985 [GB] United Kingdom .................. 8506365

[51] Int. Cl.$^4$ ............................................. G05B 19/00
[52] U.S. Cl. .................................... 364/468; 364/132; 364/474; 364/513
[58] Field of Search ............... 364/468, 474, 475, 478, 364/142, 131–136, 513

[56] References Cited

U.S. PATENT DOCUMENTS

| | | | |
|---|---|---|---|
| 4,237,598 | 12/1980 | Williamson | 364/474 |
| 4,281,379 | 7/1981 | Austin | 364/132 |
| 4,472,783 | 9/1984 | Johnstone | 364/468 |
| 4,564,913 | 1/1986 | Yomogida | 364/468 |
| 4,580,207 | 4/1986 | Arai | 364/468 |

FOREIGN PATENT DOCUMENTS 2087598 5/1982 United Kingdom .

Primary Examiner—Jerry Smith
Assistant Examiner—Allen MacDonald
Attorney, Agent, or Firm—Cushman, Darby & Cushman

[57] ABSTRACT

An automated industrial processing or manufacturing installation including a series of computer controlled facilities such as machine tools, workpiece and tool conveyors, and storage devices is controlled by a computer system wherein the control software is structured as a series of elemental function modules which intercommunicate by way of a high level communication interface. The functions are structured so as to fall into one of the categories job-route sequencer, activity managers, controllers and servers with a route-sequencing module controlling the sequence in which various activities are performed in relation to a processing or manufacturing job being carried out by the installation, each activity manager distributing activities to a group of controllers for which it is responsible, and the controllers being responsible for executing activities as and when they are received from the associated manager, the servers meanwhile providing general services for the other elements of the system.

1 Claim, 2 Drawing Figures

INDUSTRIAL PROCESSING AND MANUFACTURING SYSTEMS

This invention relates to industrial processing and manufacturing installations. More particularly, but not exclusively, it relates to a so-called Flexible Manufacturing System (FMS) cell comprising a computer system linked to one or more computer controlled machine tools, a workpiece conveyor or carriage, one or more robots possibly, and perhaps also tool-changing mechanisms for installing selected tools into and out of the machine tool(s). The computer system controls the other items so as to achieve full or at least a high level of automaticity in the production of say small aircraft parts, printed circuit boards or the like. The computer system may provide or be linked to a computer aided design (CAD) facility and a computer aided management (CAM) facility. Usually, the intention is to be able to produce comparatively small numbers, perhaps even only one, of each of many different parts. However, the invention could also be applied to a more dedicated automatic production line producing large numbers of examples of a single item.

An FMS cell may well comprise different proprietary machine tools and controllers which have been designed at different times and hence incorporate different levels of technology, different interface standards and/or simply different manufacturer's preferences. As a result, it will often be necessary to provide some kind of software and/or hardware interface between each tool or item within the cell and the controlling computer system.

By way of example, our patent application U.K. Pat. No. 2,087,598 discloses an interface unit by which a 'Ferranti Copath' machine tool can be coupled to a modern numerical control computer system. Later machine tools might have quite advanced controllers which it is sensible to retain but which accept instructions from a punched paper tape reader rather than direct from a computer. Thus, there has to be provided a software interface for converting the computer instructions to the form output by a paper tape reader. The machine tool itself may have some controls and feedback indicators not accessible via the controller, for example a drive cut-out button and some warning lamps perhaps. If the machine is to be fully integrated into an FMS, a software/hardware 'button-pushing' and 'lamp sensing' interface has to be provided. Even more advanced machine tools might be able to receive instructions and provide feedback information directly from and to the controlling computer system but a specialised interface may still be desirable, for example to ensure that the machine can properly interact with say a workpiece conveyor or tool changing mechanism. Each interface could of course be a custom made combination of software and hardware. However, a consideration of different interface problems arising in practice may show that certain parts of each solution, at least as regards the software, are common.

In addition, the creation of an FMS cell is often a progressive process. For example, it might be developed from say the level of a DNC system by gradually adding to it additional facilities. If, as has been the previous practice, the control software is inherently customised to some existing system level, that software may well require to be virtually completely re-written each time that a new facility is added.

Thus, according to one aspect of the invention, there is provided an industrial processing or manufacturing system comprising a plurality of hardware items, including one or more machine tools, all linked to a controlling computer system, which system has been so programmed at a first level that there is available to an applications programmer operating at a second higher level, a library of software modules each operable to carry out a respective function associated with the interfacing of said hardware items to said computer system.

By way of example, the software modules might include modules for converting machine tool control data from one format to another, say from the control computer system format to a 'paper tape reader output' format or to a format suitable for feeding directly to the hardware portion of the interface disclosed in patent application U.K. Pat. No. 2,087,598 or to manufacturers 'own' formats, file server modules for handling job queue files and so on.

The modules will generally have to communicate with one another and this is preferably done by way of a communication system made available within the computer system as described herein, the modules being provided with respective local communication exchange sub-modules. Preferably, since the controlling computer system may be a distributed system with a plurality of processor stations linked via some form of local area network, remote communication exchange modules are provided through which, and their respective local communication sub-modules, tw modules can communicate.

Advantageously, inter module remote communication is based on a strategy under which different modules are regarded as 'service providers' and 'service users' or clients. Service users, when in need of a service, will make the required service known to the communications system and will be then put in contact with the appropriate service provider.

According to a second aspect of the invention, there is provided an installation which comprises a plurality of computer controlled processing facilities linked to a computerised control system and which is operable automatically for carrying out industrial processing jobs each involving the performance, in sequence, of one or more items of work from each of a plurality of different kinds of activity, the control system being programmed with software in the form of a plurality of function performing modules able to communicate one with another on a service-provider and client basis via a common communication facility, and said modules including:

- a plurality of server modules for providing respective ones of a series of elemental services including low-level access to and control of computer file storage,
- a plurality of controller modules for controlling respective ones of said facilities to perform said items of work,
- a plurality of activity manager modules each of which is responsible for controlling one or more controller modules associated with the same activity, and
- a job-route sequencing module which is operable for using a file access server module to obtain from a stored job file information concerning jobs to be carried out and the items of work associated with each such job, the job-route sequencing module being further operable for distributing said items of work in the sequence in which they are to be carried out to the appropriate ones of said activity manager modules and fr maintaining track of the progress of each job by receiving from the activity manager modules indications that particular items of work previously passed to them have been completed, each activity manager module being further operable for receiving the items of work distributed to it by the job-route sequencing module, for maintaining a queue of such items, for passing the items in sequence to the controller module or an appropriate one of the controller modules for which it is responsible, and for passing back to the job-route sequencing module an indication of completion of each item of work, and each controller module being operable for requesting a new item of work from its associated activity manager module, for receiving any such work item passed to it as a result of said request and for then controlling the associated facility to carry out that item of work.

Figure 2:
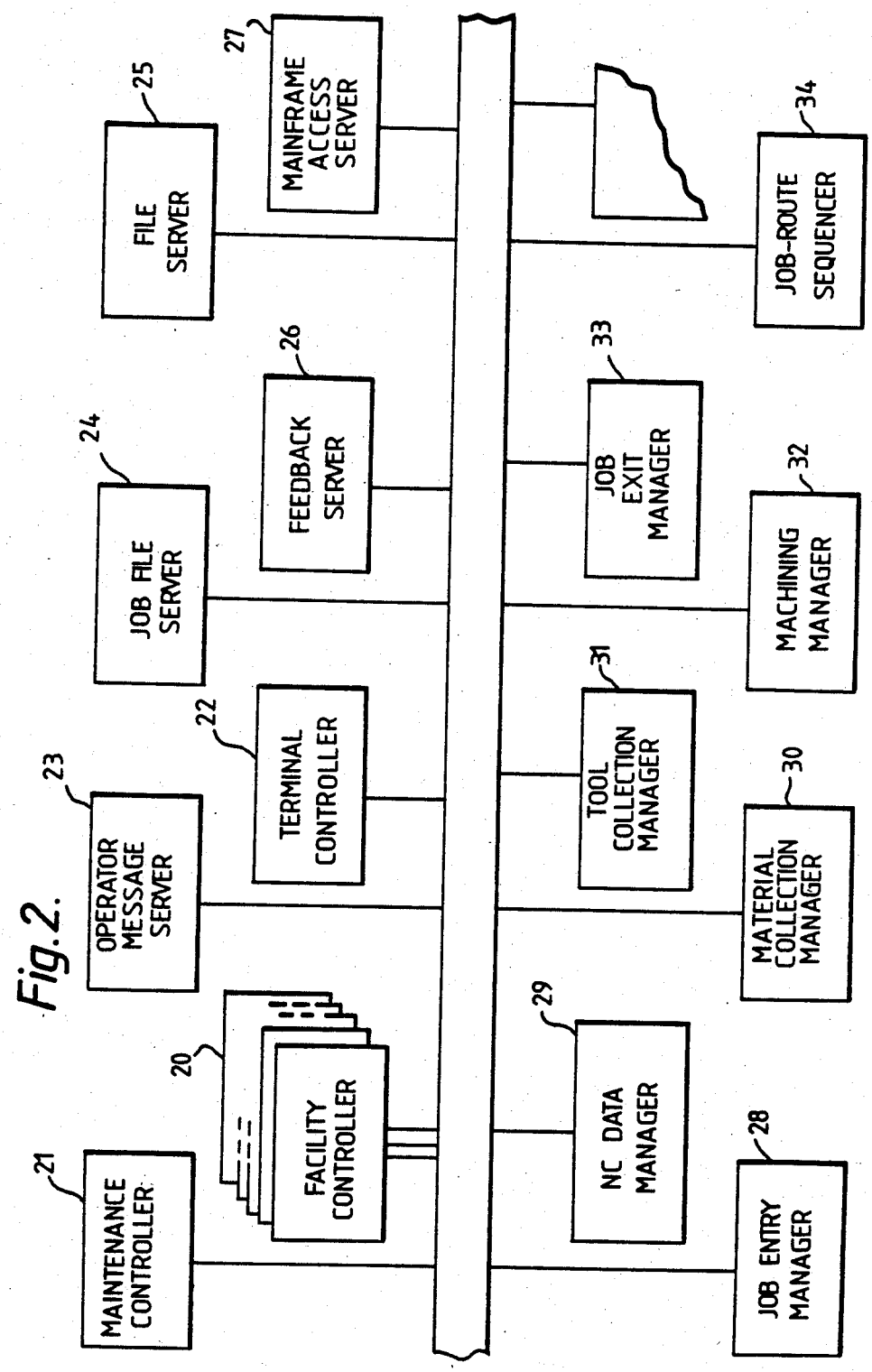

For a better understanding of the invention, reference will be made, by way of example, to the accompanying drawings, in which:

FIG. 1 is a block diagram of one possible physical implementation of a flexible manufacturing cell, and FIG. 2 is a block diagram for explaining the structure of the control software for the FIG. 1 cell.

The manufacturing cell of FIG. 1 comprises three machine tools 1, 2 and 3, two paternoster storage units 4 and 5 respectively for the storage of workpiece materials and cutter tools, five transfer tables 6 positioned adjacent respective ones of the machine tools 1, 2 and 3 and the storage units 4 and 5, and an automatic guided vehicle 7. Each store 4 and 5 is capable of transferring a tool pallet or workpiece billet to its adjacent transfer table from where the vehicle 7 can pick up the pallet or billet and carry it to the transfer table associated with one of the machine tools. The vehicle 7 receives guidance and control signals from a controller 8 via an underfloor cable bus 9. Items on the machine tool transfer tables 6 are retrieved and positioned in or on the associated machine tools by respective loading mechanisms (not shown). Further information about such mechanisms is given for example in European Pat. No. 0138600. It is emphasised however that FIG. 1 is given only as an example for explaining the kind of functions required to be carried out in an FMS cell. In practice, there may be a different number of machine tools, perhaps quite a large number, with different ways and means of supplying them with materials and cutter tools. The system could for example be physically constructed along the lines disclosed in U.S. Pat. Nos. 4,237,598 and 4,369,563.

In general, however, the system will comprise a computer control system which, in the illustrated case, is a distributed system with say three computer nodes 10, 11 and 12, ie three separate but linked computers, and a series of facilities, such as those described in relation to FIG. 1, each with an associated controller 8. The controllers and the nodes of the control system are linked together by a local area network bus 13. Depending upon the particular facility, the associated controller may be physically implemented in one of three different ways. Thus, the machine tool 1 might have a controller which is fully compatible with the computer control system described hereinafter and which can be caused by the system to initiate all the machine operations which may be required. Machine tool 2 on the other hand has a controller which is not compatible or is only partly compatible with the system and/or is only capable of initiating some of the machine operations which may be required. The incompatibility may be because the control signals and the kind or format of the control data required by the controller are not the same as those which would normally be supplied by the system. Also, the machine tool may comprise control features which were originally intended to be manually operated, ie not via the associated controller. For this controller therefore, there is provided a discrete driver 14 which, as appropriate, may comprise suitable computing apparatus for adapting the system issued commands and data format in accordance with the requirements of the controller and/or may have one or more inputs direct to the machine tool for automating the control features originally intended to be dealt with manually. One fairly common example of a data format adaptation which might be carried out by driver 14 is the conversion of DNC (direct numerical control) data to the signals which would be generated by a punched paper tape reader incorporated in the controller of some automatic machine tools. Such converted signals are then fed into the controller downstream of, and hence so as to bypass, the tape reader. Particularly where the adaptation required by the machine tool controller concerns data formats and the like, the or some of the adaptation could be carried out by a suitable software drive routine within the computer control system itself. This possibility is illustrated by a block 15 drawn within system node 12 but, as will be appreciated, this block does not represent a physical item.

Each of the controllers 8 and the computer network nodes 10, 11 and 12 will have an input/output port and associated software suitable for the chosen form of the local area network. This could comprise a proprietary item such as that known by the name Ethernet. There could be more than one such network and these could be of different form chosen say for their suitability to different communication tasks.

By way of suitable software 18 incorporated in say the node 12, the computer control system can communicate with a factory systems mainframe computer 16 which can support computer aided design and computer aided management facilities. The control system will also be linked to one or more input/output devices such as the illustrated display unit/keyboard terminal 17.

The software with which the computer control system is programmed consists of a series of modules each designed to carry out a particular element, with or without the assistance of other modules, of the overall control function. Each controller 8, where appropriate in conjunction with its associated driver 14 or driver routine 15, can be and is also viewed as a module within the overall program. The modules are distributed amongst the computer system nodes 10, 11 and 12 as required and they each incorporate a series of high level interface routines by way of which they are able to carry out any required communication with other modules. Effectively, each module incorporates a local communication portion through which it communicates with the corresponding portion of another module within the same system node. The local area network software within the controllers and each node itself consists of a module with a local communication portion so that, if a function module in one node has to communicate with a module in another node or with a controller, it does so by sending a message via its own local communication portion, the local communication portion of the network software module, the local area network, the network software module in the controller or other node, and then to the local communication portion of the other module. Provided no other forms of inter-module communication is permitted, this arrangement ensures that the system is easily adaptable for say upgrading—modules can be added to the system without having to modify large numbers of the existing modules to suit. Inter-module communications conform to the following rules:

1. Modules communicate by message exchange.
2. Communication is on a service provider and client basis, i.e. a service provider, and client who uses the service.
3. Communication takes place over logical bi-directional channels between modules.
4. A module references another by a unique name, that name being assigned to the remote module when it is written.
5. Each communication system element will keep a record of the modules its supports and those remote modules that it was requested to contact—consequently the directory of module names to physical addresses will be dispersed throughout all communication system elements.
6. Messages are only passed to the destination modules if they are free of errors checked for within the communication system. Thus, a module which receives a message may assume that the message is intact.
7. Message exchange will be accmplished by a limited set of external procedure calls (procedures external to application module).
8. All status returns to the calling function will be provided by the communications system—not by the destination module.

As a consequence of these rules the communication system will normally be transparent to the application programmer. Special calls will be available to the application programmer to communicate with his own communication system—examples are 'cataloguing the application name', 'terminating logical channel communication'.

Module communication will be independent of the physical location of the modules. Modules communicating within the same node will use precisely the same mechanism as modules communicating over the network.

At a logical level, the system may be thought of as a number of modules interconnected by a bus type structure as shown in FIG. 2. Each module may be categorised under one of the headings controller, server, manager and router. The facility controllers 20 are the physical controllers 8 in FIG. 1, where appropriate in combination with the associated driver 14 or driver routine 15. Servers are modules which supply some service to another module, for example file handling and access, operator message handling via the terminal 17 in FIG. 1, and access to the mainframe computer 16. Managers co-ordinate the action of controllers and servers to perform each of a series of functions associated with a machining job, for example there would be a manager associated with a group of similar machine tool controllers for distributing work to those controllers as and when required. The single router or 'sequencer' module shown is operable to process jobs according to a job dependent description of the activities to be performed (called the job route). The router interprets the job route and places work on the various managers.

As mentioned earlier, the interaction between the various modules is based on a service-provider and client relationship in assymetric roles. In any communication between modules one partner takes the role of the service or resource supplier, the other the client or resource consumer. Initially, the service provider declares its willingness to take part in an exchange with an as yet unknown client. The client requests the services of the service provider and opens the exchange or 'session' which then proceeds until either partner breaks it off.

In general servers, controllers and managers communicate with one another, and in general the router converses with managers. Thus, the router becmes a client of the manager to inform it of a new item of work. A manager becomes a client of the router to inform it of completion of that item. In this way, each manager can maintain a queue of pending items of work and hence can perform arbitration, i.e. it can give different priorities to different items of work and act accordingly. Also, the router has only one session open at a time which simplifies structure of the router.

Meanwhile, a controller becomes a client of a manager reporting any major change of state, eg to inform that manager that the controller requires more work or has completed current work. A manager becomes a client of a contrller to request the current controller status. By this means, the controller is able to supply status information to any other module, the controller needs no knowledge of pending jobs, no arbitration and no queue, and a manager does not need to know how many controllers there are.

A server supplies services to its clients. The server may itself become a client of another server.

The particular elements shown in FIG. 2 are as follows:

Maintenance Controller (21)

The Maintenance controller supports a range of maintenance functions. For example display error conditions, allow access to module exercisers, display system status, allow loading/update/distrbution/configuration of software.

Facility Controller (20)

As mentioned earlier, these are modules through which particular facilities are controlled.

Terminal Controller (22)

This element provides VDU screen services for all operator functions. Any requirement for access restrictions through protection or password mechanisms will be implemented in this element.

Operator Message Server (23)

Allows operator messages to be routed through the system between machine operators and the system operators.

Job File Server (24)

The details of all jobs known by the system are held centrally by this module. All other modules may access this common data source for job information. The job file holds references to all global data associated with each job.

File Server (25)

The File Server allows low level access to create, modify and delete files. It provides file services to the rest of the system.

Feedback Server (26)

The Feedback Server will collect feedback data from other modules, collate the data, and then pass the reduced feedback data to the Mainframe computer on a periodic basis. This involves the use of the mainframe Access Server.

Mainframe Access Server (27)

The Access Server will support the ability to retrieve data from and to send feedback data to the mainframe computer. An example of how modularity eases the change to a system is that this module may be changed to interface to a different mainframe without impact on other modules.

Job Entry Manager (28)

This module places new jobs onto the system. The module creates a new job file record with some fields filled by externally supplied data and some generated internally for system use. The job entry manager becomes a client of the job router once the job file record is created and passes the job reference to it.

NC Data Manager (29)

The NC Data Manager is responsible for the acquisition, storage update and deletion of numerical control data ie all the data required by a machine tool controller, such as Layout Text, in order to carry out a machining operation. Given job information, it ensures that the data for the job is present and catalogued in the system.

Material Collection Manager (30)

This module is in control of obtaining the material for the job and will therefore maintain records of materials available in the material store and will place tasks on the controllers associated with the material store, its adjacent transfer table, and the transport vehicle with a view to making available those materials to the machine tool as and when required.

Tool Collection Manager (31)

The function of this module is similar to that of the materials collection manager except that it is in control of tools rather than materials.

Machining Manager (32)

The machining manager distributes work to the machine tool controllers. Once data, material and tools are available the machining manager is authorized to undertake machining. The machining manager processes the authorized work on the basis of machine availability and job details.

Job Exit Manager (33)

This module controls the removal of jobs from the system. It informs all interested modules that the job is leaving the control of the system. For example the NC data manager needs to be told that the part programs are no longer required, the feedback manager will catalogue the completion of the job, the job file server will delete the job file for the job.

Job-Router Sequencer (34)

This module controls the flow of work between the various activity managers. The job router receives requests from clients for the processing of jobs. The router takes the job reference and uses the job file server to obtain the current job state and job route. The router then invokes the next appropriate action on the basis of the job state and route. In some cases the action may be to wait until some other action is complete, or to invoke a number of concurrent actions, or to evaluate some condition and modify the job state accordingly before proceeding with the job route.

Thus, each job enters the system through the job entry manager which creates all the appropriate job records.

The job entry manager becomes a client of the router to tell it that entry of a new job has been completed. The router then uses the job identifier to look up the job in the job files. The data in the job file is used by the router to determine where the job is to be sent next.

The router becomes a client of the next activity manager(s) to be involved in the processing of this job.

The activity managers offer a service of receiving jobs into their own queue or job pool. The managers arbitrate between these competing jobs as their own resources become available.

The managers call on the various services offered in the system in order that they may execute their jobs.

Managers become clients of the controllers to instruct them to perform work. When a controller completes a task or has something to report then it becomes a client of the manager.

Controllers may become clients of the various servers in the system. The controllers themselves offer status reporting services to any other module in the system.

When any activity manager completes a job it becomes the client of the job router whereupon the router progresses the job to the next activity manager.

The final activity is to remove the job from the system, to close all job files, delete all extraneous data and conclude any feedback reporting.

Because of the division of the control system software into a series of modules and the division of responsibilities as described amongst controllers, servers, managers and the job-route sequencer, it becomes very much simpler not only to set up the system initially but also to adapt and upgrade it. Thus, say that a further machine tool is to be included in the system and that this requires a new controller/driver module. That module may well be able to make use of already existing server modules or services. For example, if it needs to convert DNC data to punched paper tape reader format and if a suitable conversion module already exists in the system for use by the controller/driver of another machine tool, then the new module can simply call on the services of that existing conversion module. At its simplest, an added module might consist of little more than a series of calls for service from already existing modules. If a completely new service is required, then of course it can be added to the system. From then on, however, that additional service is available for use in connection with further upgrading of the system. It may even be possible to place the controller/driver module for the newly added machine tool under the management of an existing activity manager without having to substantially modify that manager or the job-route sequencer.

As mentioned earlier, the modules communicate one with another by passing messages through a common high level communication facility. This is designed to provide a large buffer between the modules and the hardware 'cradle' in which they run and it is the only interface that any module has with its peers. Access to it is by way of a procedure call from the module to an externally provided procedure library. Each such call returns an 'exception' code which the module must check before proceeding. Naturally, some of the calls do not return until another module issues a 'matching' call and so modules that must continue processing during these system 'hold-ups' are provided with a 'multi-tasking' capability.

As an extension to the plain message passing interface between applications, a special 'remote procedure call' interface may be provided. This will allow a client to call a procedure within a service supplier. This is a design time decision, as are all of the semantics of the conversations between modules. Such a service supplier will have catalogued the 'access points' to its procedures in a library which will be attached to the client at compile or link time. The client will call up the service provider module, and when they have been put in contact the client user may issue the remote procedure call. The client application programmer can treat these remote procedures as an extension of his local resource.

Each module has a name which other modules can use to gain access to it and each such name comprises two or more fields, one of which identifies the service provided by the module while others identify the module more uniquely, say by identifying its system location or address. This arrangement permits at least some modules to be duplicated, perhaps at relatively distant physical locations within the overall system whereupon, if a client module simply requires use of a service rather than access to a particular module, it can issue a call by reference only to the service identifier field of the relevant modules. The communication system will then put the calling module in communication with whichever of the duplicated service provider modules it chooses according to convenience and availability. By contrast, a client module wishing to access a particular service provider module can issue a call using the whole name of that module. This feature permits an element of redundancy to be incorporated in the system hence giving better reilability and/or faster operation.

Having received a call, the communication system establishes a full duplex logical channel between the two modules whereupon the modules pass messages to one another using simple 'read' and 'write' calls to the communication system. Each module must, of course, format the content of its messages in a way acceptable to the other. The logical channel is normally broken by either module terminating the conversation on an agreed basis. Preferably, the communication system will incorporate an error channel by which the modules can be informed of the channel being broken for any other reason.

The communication system may comprise a series of sub-routines or 'procedures' in a library made available to the function modules. Some of these procedures handle local communications, for example between modules resident in the same computer node, and as a group can be regarded as a kind of local communication exchange (LCX). At least for the FIG. 1 system or any other which includes any form of network communication, there will be one or more further groups of procedures for handling the network communications, one group for each type of network in use. The or each such further group can be termed a remote communications exchange (RCX). Access to the LCX procedures involves the inclusion, in a function module which is being written, of appropriate ones of a series of procedure calls each accompanied by the parameters which are to be used by the called procedure. The LCX group include procedures for handling all these calls, i.e. no calls can be made direct to any of the RCX group. If a particular function module requires communication with a remotely located module, the facility can be provided for specifying this in the parameters passed to the LCX procedure. Otherwise, the LCX procedure itself decides how it is going to satisfy the call, i.e. by putting the calling module in touch with a local module or using the RCX procedures to access a remote module. In this way, except in the particular circumstance mentioned, it is not necessary for the person who is writing a software module to know where any other module is located—he only needs to know its name. The communication system will then find the named module and provide access to it using whatever other procedures are necessary. It may be that the calling module does not even require access to some particular module but instead requires a service which could be performed by any of two or more modules providing that service. In this case, the calling module can just issue a call with parameters naming the service required and the communication system will choose a module to provide it.

As will be appreciated, even local communications may not be handled entirely by the procedures referenced in the function module—rather, these procedures may themselves make use of further procedures provided in the library. Thus, the communication system can be thought of as a series of levels. The top level includes the actual procedures which are able to be referenced in the function module and, below that, are levels containing further procedures for handling what might be called the details of the communications. These lower level procedures include the RCX group and can, of course, include proprietary software, for example the Ethernet software used for the local area network communication in the FIG. 1 system.

Following compilation and linking of each newly written module, it will comprise a series of 'stubs' which reference the real procedures provided in the library. At a logical level, therefore, each such compiled function module comprises its own complete communication portion even though, in reality, the communication facilities are held in the common library.

The LCX calls which are supported include for the particular use of service provider modules, a 'create supply' call, an 'await-client' call, a 'detach client' call, and a 'delete supply' call, and for the particular use of client modules (remembering that some modules will be both service-providers and clients at different times), a 'select service' call, an 'attach service' call and a 'detach service' call. In addition, the generally applicable 'read' and 'write' calls will be provided as mentioned earlier and perhaps also a 'read error' call. When any of these calls are issued, the appropriate library procedure is referenced. Initially, service provider modules make respective 'create-supply' calls so as to catalogue themselves in a service provider table maintained by the appropriate procedure. The procedure may also take account of duplicate service providers, for example if it finds that a particular offered service has already been catalogued, it can supplement the catalogued service name with an identifying number which is then also returned to the service provider module. Each record in the service provider table will generally also have a status field in which it can be noted whether or not the particular service provider module is in use. Following issue of the create-supply call and then each time that the module has been in use, the service-provider module will issue an 'await-client' call to indicate that it is available for further use. Thereafter, a call to access that service results in a return being passed to the service provider module in response to its await-consumer call, setting up of the communication, and the status field for the relevant service-provider being marked to indicate that it is in use. There may be various other interchanges between the service provider module and the communication procedure, for example recording and passing to the service provider a token indicative of the logical communication channel which it is to use.

When a communication has ended, the service provider issues a 'detach client' call and, amongst other winding up actions, the appropriate procedure closes the appropriate channel and marks the service provider status field as 'available'. The service provider can issue a 'delete-supply' call so as to make itself generally not usable by any other module except perhaps say by a maintenance module.

A client module will issue a 'select service' call when it requires some service. Depending on the completeness of the name by which it describes that service, the appropriate procedure will put it into contact with any available module providing that service, or a particular module, or say only a local supplier of the service or only a remote supplier. It is particularly here that various further procedures may be called by the 'select service' procedure, for example the remote communication procedures which are made available. If and when the appropriate service has been found, and is available, the fact is noted to the calling client module which then issues an 'attach service' call. In response thereto the communication channel is set up and the appropriate channel token is issued. When the session has finished, the client module issues a 'detach service' call. This occurs at or about the same time that the service provider modules issues its 'detach-client' call and assists in the closing of the communication channel and associated winding up operations. The 'read' and 'write' calls, as they suggest, indicate that a message is awaited or about to be delivered and will control the reception of a message into an appropriate memory area and making the location of this area known to the module which is to receive the message. The 'read-error' call is issued by any module wishing, for example, to ensure that a message sent by it was correctly received. The appropriate procedure returns with any errors reported to it by appropriate monitoring routines. Generally, these errors will involve system failures or other catastrophic errors. Simple failures, such as the fact that a called module is busy, is reported as a return to the appropriate procedure calls.

As will be realised, at least the lower levels of the communication system will be hardware dependent, i.e. they will be customised to the particular hardware item of the computer control system in which they are to run. However, provided that the function module/communication system interface is maintained constant, e.g. provided that the top level procedure calls are always supported the function modules themselves can be very largely portable, i.e. they can run anywhere in the system, and in addition upgrading of the system can consist of merely adding new function modules without having to adapt existing modules or the communication system to suit. Effectively, these rules also allow upgrading of the communication system itself comparatively easily—for example, a new form of network can be added or some existing piece of proprietary communication software can be replaced by an updated version and any necessary resulting system changes are confined to the communication system—the function modules themselves can remain unchanged.

It will be further realised that any of the nodes and other hardware items shown in FIG. 1 might itself consist of two or more computer processors communicating one with another, say by way of a backplane bus. It may be advantageous for the communication concepts described earlier herein to be extended also to within any such hardware item, i.e. so that the software for the two or more processors in the item is also modular with inter-module communication by way of the described common LCX procedure calls and these called procedures then accessing lower level communication software, for example proprietary backplane bus software.

Finally, it will be appreciated that the concepts described are not only applicable to a distributed computer system with nodes linked to each other and the FMS cell facilities by a local area network—rather the invention is also applicable where the control system comprises just a single computer perhaps with separate control and data lines leading to each facility of the cell.

We claim:

1. An installation which comprises a plurality of computer controlled processing facilities linked to a computerised control system and which is operable automatically for carrying out industrial processing jobs each involving the performance, in sequence, of one or more items of work from each of a plurality of different kinds of activity, the control system being programmed with software in the form of a plurality of function performing modules able to communicate one with another on a service-provider and client basis via a common communication facility, and said modules including:

a plurality of server modules for providing respective ones of a series of elemental services including low-level access to and control of computer file storage, a plurality of controller modules for controlling respective ones of said facilities to perform said items of work, a plurality of activity manager modules each of which is responsible for controlling one or more controller modules associated with the same activity, and a job-route sequencing module which is operable for using a file access server module to obtain from a stored job file information concerning jobs to be carried out and the items of work associated with each such job, the job-route sequencing module being further operable for distributing said items of work in the sequence in which they are to be carried out to the appropriate ones of said activity manager modules and for maintaining track of the progress of each job by receiving from the activity manager modules indications that particular items of work previously passed to them have been completed, each activity manager module being further operable for receiving the items of work distributed to it by the job-route sequencing module, for maintaining a queue of such items, for passing the items in sequence to the controller module or an appropriate one of the controller modules for which it is responsible, and for passing back to the job-route sequencing module an indication of completion of each item of work, and each controller module being operable for requesting a new item of work from its associated activity manager module, for receiving any such work item passed to it as a result of said request and for then controlling the associated facility to carry out that item of work.

* * * * *